United States Patent Office 2,966,538
Patented Dec. 27, 1960

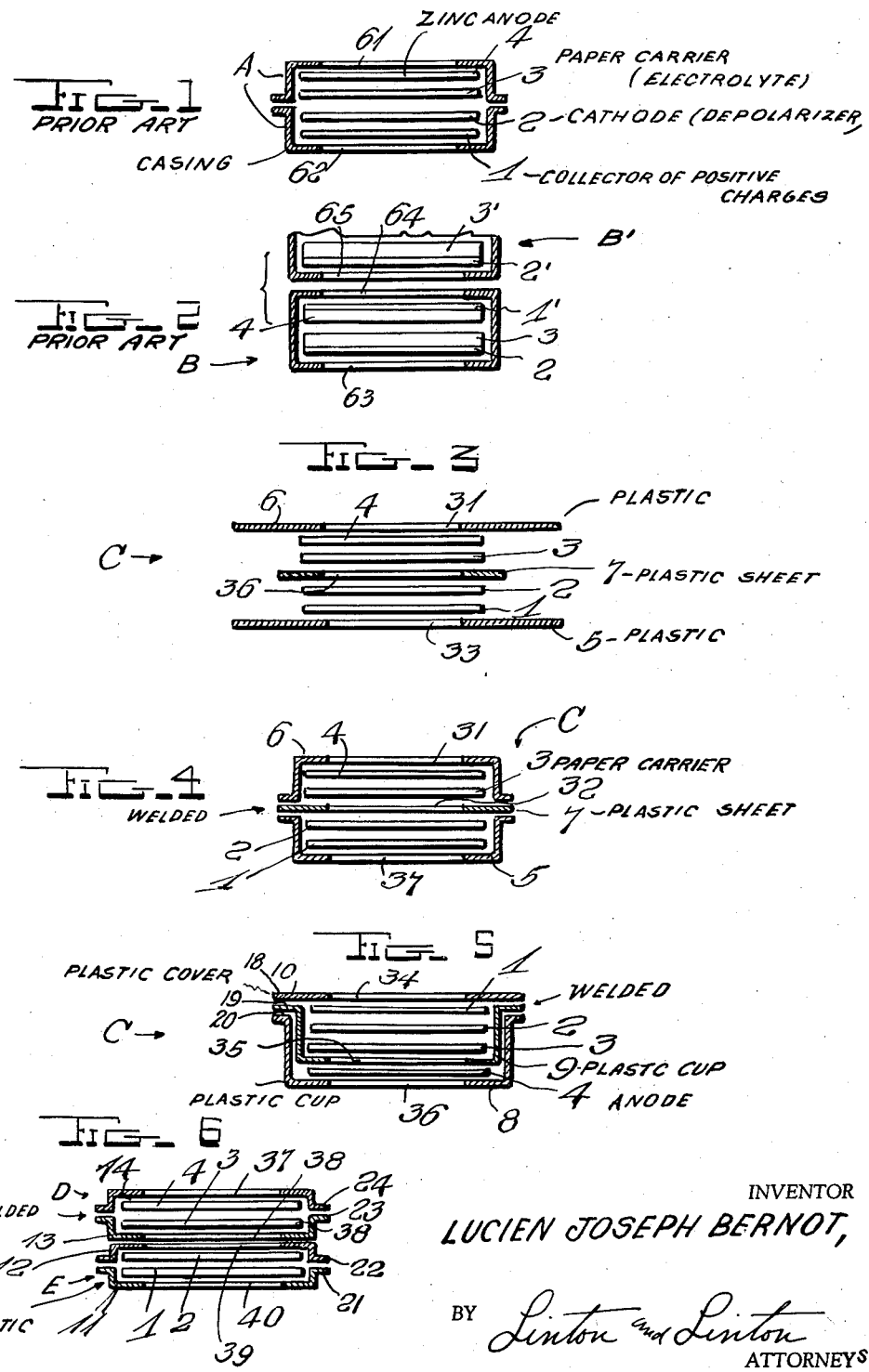

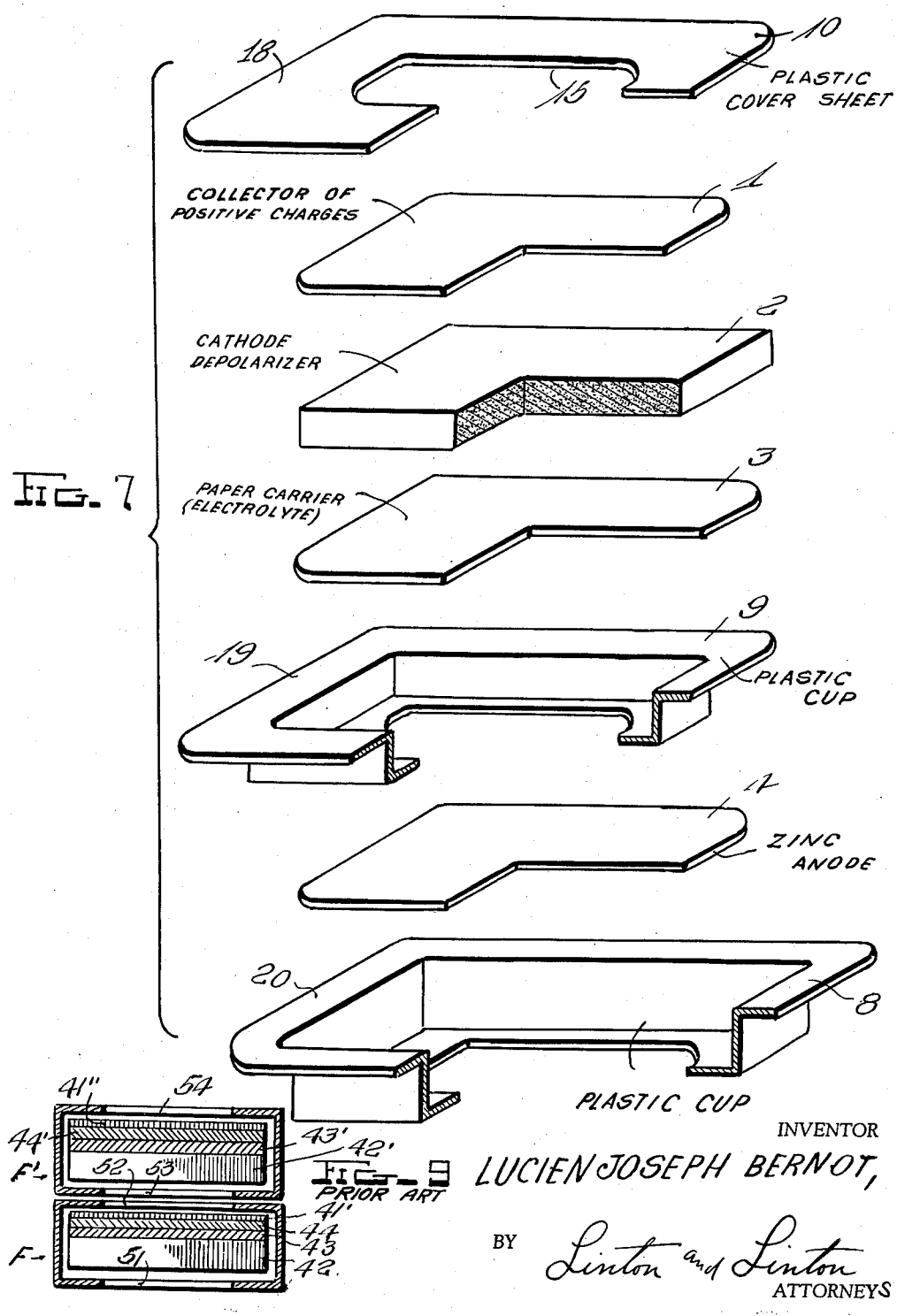

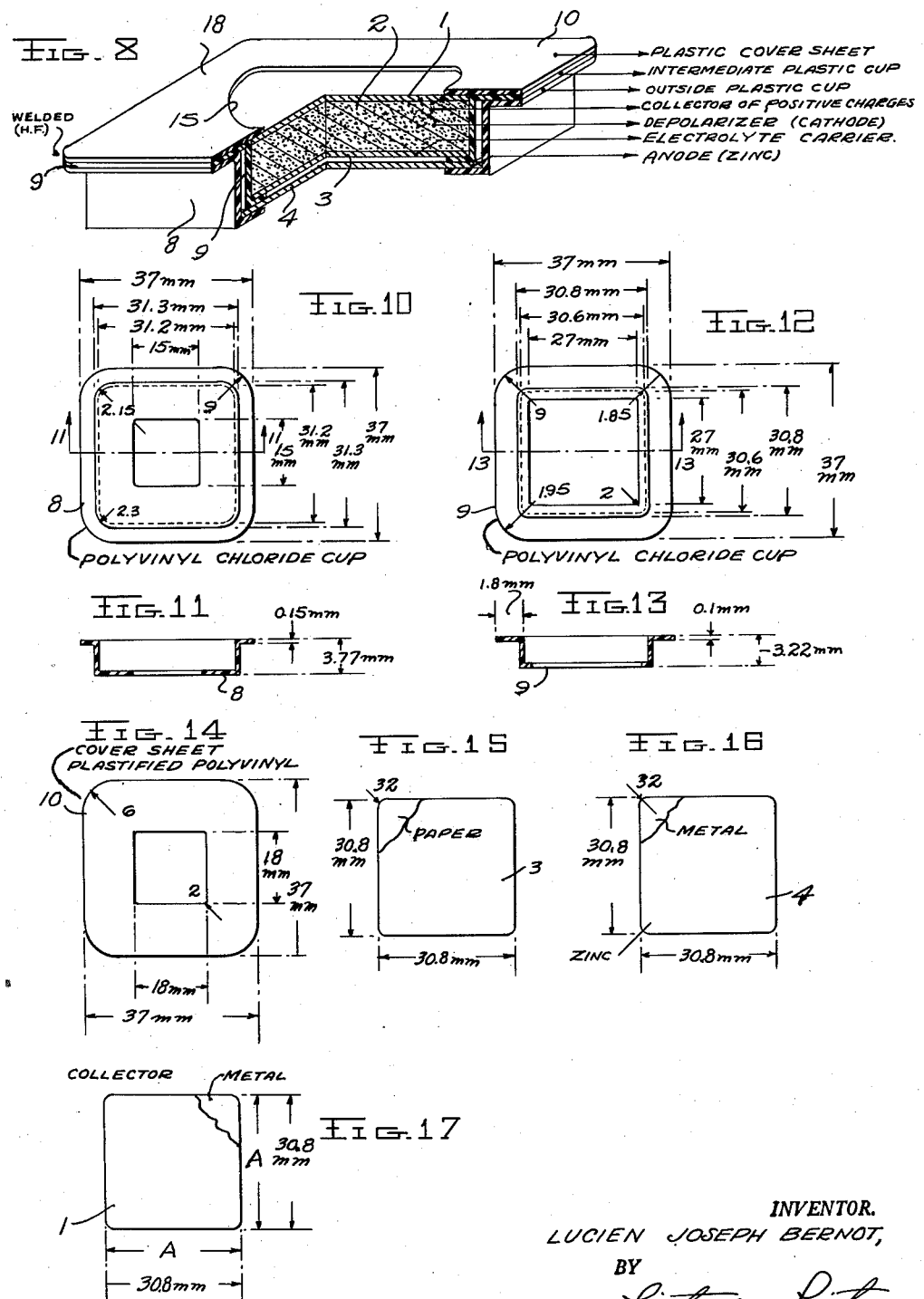

2,966,538

PLASTIC ENCASED FLAT DRY BATTERY STACK WITH MEANS TO PREVENT PERIPHERAL ELECTROLYTE CREEP

Lucien Joseph Bernot, Choisy-le-Roi, France, assignor to Société les Piles Wonder, Saint-Ouen (Seine), France, a company of France Filed Mar. 12, 1958, Ser. No. 720,909

Claims priority, application France Feb. 12, 1954

10 Claims. (Cl. 136—111)

The present application is a continuation-in-part of my copending application Serial No. 487,399, filed February 10, 1955, and now abandoned.

The present invention relates to a primary battery of the dry type composed of a number of stacked cup-shaped cells.

Electric batteries of the flat cell type generally include flat cells constituted chiefly by the four essential components of a complete electro-chemical chain or unit, to wit, a collector of positive charges, an agglomerated depolarizer substance acting as a cathode, an electrolyte associated with a carrier and lastly an anode.

In such known batteries, the collector for the positive charges and the anode form respectively the non-porous terminal components of the electrochemical chain of which the agglomerated depolarizer substance forming the cathode and the electrolyte associated with its carrier form the intermediate porous components.

Generally, these four components of an individual or elementary cell for one unit of a battery are held together by means of a band or casing of plastic material the edges of which are bent or folded back over opposite sides of the cell respectively.

Other electric batteries are known wherein the band or casing which has just been mentioned is replaced by two sheets of plastic material which are suitably perforated and between which are fitted the four essential components of the cell, these two sheets being then thereafter welded together laterally so as to form again a sort of band or wrapping.

Two or more such individual or elementary cells constituted as described hereinabove may be superposed in a stack, the contact between two adjacent non-porous terminal components of two successive cells being provided through a clamping action ensuring the connection between said two cells.

Although each elementary cell should always include the four essential components of an electrochemical chain as disclosed hereinabove, one at least of these components may however belong to one electrochemical chain of one unit and the three other components belong to the next electrochemical chain of another unit.

Thus one individual elementary electrochemical cell forming one unit of a battery may include for instance in superposition in a stack, beginning from the bottom and counting upwardly in sequence, an agglomerated depolarizer mass forming the cathode, and an electrolyte associated with its carrier, said cathode and electrolyte forming two parts of the same electrochemical chain or unit, and then an anode, and a collector of positive charges, belonging to a different electrochemical chain or unit, said four components being enclosed inside the same band or between the same sheets of plastic material.

In this case, the collector of positive charges arranged at the upper end of said cell and belonging to a different electrochemical chain or unit, will be in electrical contacting relationship with the depolarizer or cathode of the cell lying immediately above the precedingly referred to cell, as soon as the bands or sheets of plastic material of the two adjacent cells thus superposed have been brought in contacting relationship.

In the drawings:

Fig. 1 shows an arrangement of the prior art wherein the cathode and anode and other components of an electrochemical unit are contained within a single two-piece casing.

Fig. 2 shows an arrangement of the prior art wherein the cathode and anode and other components of an electrochemical unit are contained within a single one-piece unit.

Fig. 3 shows in principle in preliminarily first juxtaposed position the elements of a first embodiment of the present invention wherein two adjacent chambers respectively contain components of an electrochemical unit and are separated by an impervious plastic sheet.

Fig. 4 shows a substantially finally processed and assembled form of the embodiment of Fig. 3, wherein two mutually facing cups have been stamped to constitute the component-containing chambers but have not yet been hermetically sealed together by their edges with the separating impervious sheet.

Fig. 5 shows a second modified form of embodiment of the present invention wherein two nested cups facing the same way contain the electrochemical components but have not yet been hermetically sealed together by their edges with the impervious plastic cover sheet.

Fig. 6 shows a third embodiment of the present invention wherein two units are stacked, each consisting of two facing cups with projecting edges, and each unit containing electrochemical components, before the edges of the cups are sealed together.

Fig. 7 shows separated and in juxtaposition the several parts of a cell of a type similar to Fig. 5.

Fig. 8 shows a cell of the type of Fig. 7 with the parts all assembled.

Fig. 9 shows two cells of the prior art of the type of Fig. 2, with their parts, one superposed above the other.

Figs. 10 and 11 show in plan and section respectively the terminal plastic cup of Fig. 5 with all its preferable dimensions in millimeters for a cell as actually used in production. Fig. 11 is a section taken on the line 11—11 of Fig. 10. This cup is of the plastic known as "Vynan" (polyvinyl chloride) and may have a thickness of 0.15 millimeter.

Figs. 12 and 13 show in plan and section respectively the intermediate cup of Fig. 5 with all its preferable dimensions in millimeters. Fig. 13 is a section taken on the line 13—13 of Fig. 12. This cup is likewise of polyvinyl plastic and may have a thickness of 0.10 millimeter.

Fig. 14 shows the plastic cover sheet of Fig. 5 with all its dimensions. This sheet is preferably of plastified polyvinyl and may have a thickness of 0.15 millimeter.

Fig. 15 shows the electrolyte paper carrier of Fig. 5 with all its dimensions, and this may have a thickness of 0.10 millimeter.

Fig. 16 shows the zinc anode with all its preferable dimensions in millimeters, its thickness preferably being about 0.30 millimeter.

Fig. 17 shows the carbonaceous collector of positive charges with all its preferable dimensions in millimeters for a cell as actually produced, its thickness being preferably 0.15 millimeter.

The different arrangements of the prior art illustrated in Figs. 1 and 2 of the accompanying drawings have been generally described in the preceding paragraphs.

In Fig. 1, the four components 1, 2, 3, 4, belonging to one complete electrochemical chain, are contained inside the same band or wrapping or casing A made of two associated parts.

The collector of positive charges is shown at 1, the cathode or depolarizer mass at 2, the electrolyte with its carrier at 3, and the anode at 4.

In Fig. 2 a common one-piece band or casing B is shown as containing three components 2, 3, and 4 of one electrochemical chain or unit and another component 1' of another electrochemical unit or chain superposed over the first-mentioned chain and which is not illustrated. In Fig. 2, the fourth component 1 of the first electrochemical chain considered which includes elements 2, 3, 4, is carried inside a third band or casing which is not illustrated, and which is positioned beneath the first mentioned chain or unit B.

In these Figures 1 and 2 of the prior art, the porous component 3 forming the electrolyte associated with its carrier is made of a more or less thick paper support, coated on one of its surfaces, that facing the anode 4, with a substance adapted to form a gel when it is impregnated with an electrolyte in a subsequent step, and in the absence of such an electrolyte this component is chemically inert.

The porous component forming the cathode 2 is made of a depolarizer mixture containing chiefly small particles of carbon and saturated with an electrolytic solution.

It is essential after assembling the different components of such a cell to apply a high pressure on the latter so as to squeeze part of the solution out of the cathode 2 and to urge said solution through the paper carrying the electrolyte so that it may reach the substance adapted to form a gel when it is in contact with such an electrolyte. The component 5 becomes then electrically operative and this produces a sort of priming of the cell.

On the other hand, it is desirable to keep the pressure at a constant value even after the priming of the cell, since this pressure has a tendency to improve the output efficiency of this cell.

In the known arrangements of the prior art such as those illustrated in Figs. 1 and 2, it is apparent that, when a high pressure is applied to the cell, the solutions squeezed out of the cathode may pass directly through the porous component 3 which stops the conductive particles, but this solution can also leak over the sides of the components between the latter and the wall of the band or wrapping or casing A or B. Nothing prevents the solution so leaking through such lateral passageways from carrying along with it solid conductive particles from the cathode 2 up to the anode 4 which will cause a short-circuiting of the cell. The depolarizing material can flow along the edges in the usual manner of plastic flow.

In all cases, in these arrangements of the prior art, even if the pressure assembling the cells with each other is comparatively low, there is always a possibility of the depolarizer mass of an individual elementary cell being in contacting relationship with the anode of the said cell, and its is irrelevant in this case whether the elementary components enclosed in the same band or casing do belong or do not belong to one same complete electrochemical chain or unit, since there are always a cathode and an anode superposed inside the same band or casing.

It is now proposed, in accordance with the present invention, to avoid this disadvantage of the prior art, by subdividing each individual elementary cell or unit into two juxtaposed recesses or cups or chambers sealed against each other along their peripheries, each of these chambers containing at one time only one cathode or only one anode.

This subdivision of each elementary cell or unit into two recesses or cups or chambers may be constructed by means of any suitable fluid-impermeable partition with a suitable aperture in the central section of the cell and which is ionically impermeable around the edges so as to separate from each other in impervious hermetically sealed relation the two recesses or cups or chambers and to prevent thus any flow of the depolarizer of a cathode towards an anode whether said cathode or anode belongs to one individual electrochemical chain or unit or to two different electrochemical chains or units.

In the present invention one recess or cup or chamber may enclose e.g. a collector for positive charges, a depolarizer mass or cathode, and an electrolyte associated with its carrier, while the other recess or cup or chamber may contain only the anode.

One recess may alternatively enclose a collector for positive charges and a depolarizer mass or cathode, while the other recess encloses an electrolyte associated with its carrier and an anode.

The two recesses or chambers and their boundary partitions may be made of sheets of polyvinyl chloride, which it fluid-impervious and ionically impermeable, or the like plastic material, stamped or otherwise.

When the two recesses or chambers, are constituted by two centrally apertured cups obtained by the stamping of plastic material, it is possible to use for this purpose, a large sheet of plastic material into which are stamped a number of cups as desired after which these cups are separated by cutting.

Lastly, it may be of advantage from the standpoint of an easy manufacture to use for the making of these chambers or cups or recesses containing the different components of the cell C, polyvinyl sheets or the like which are of different types; for instance the outer sheet may be plasticized while the intermediate sheets are not plasticized so as to be more rigid.

In the accompanying drawings:

Figs. 1 and 2 and 9 relate as already set forth to prior art, and

Figs. 3 to 8 and 10–17 are diagrammatic cross sections of different embodiments of the present invention.

Referring to Fig. 3, showing a cell C incorporating components belonging to one complete electrochemical chain or unit, the collector of positive charges is shown at 1, the depolarizer mass or cathode at 2, the electrolyte associated with its carrier at 3, and the anode at 4.

It has been assumed that the components of the cell C of Fig. 3 are enclosed in the conventional manner of the prior art between two sheets of plastic material 5 and 6 which are centrally apertured at 31 and 33 and which may be then welded laterally together so as to form a sort of band or wrapping surrounding the cell, the arrangement not being shown in its final condition as a band.

In accordance with the present invention, there is fitted between the cathode 2 and the electrolyte 3, a separating sheet of plastic material 7 (Fig. 3) which is also centrally apertured at 32 and which may be constituted like the first mentioned sheets 5 and 6 of polyvinyl chloride or of polyethylene. The sheets 5 and 6 may be stamped to form cups having flanged edges 15 and 16 projecting outwardly from the cup, in superposed relation, separated by the outer edge 17 of separating sheet 7 as illustrated in Fig. 4.

The three sheets of plastic material 5, 6, and 7 may then be welded together on their outwardly projecting edges 16, 16a, 17, through high-frequency dielectric losses or through direct heating, after which their periphery is machined to the desired annular shape. The cell C illustrated in Fig. 4 is thus obtained as a final product.

A high pressure applied perpendicularly to one of the surfaces of the cell will secure a tight joint between the peripheral portions of the intermediate separating sheet 7 and the components 2 and 3 located on the respective sides of said sheet, and it is then not possible for the particles of the depolarizer mass 2 or cathode to reach the anode 4.

This high pressure thus exerted on the cell will give it electric properties which are better than those provided by a lower pressure.

Fig. 5 illustrates another modification or embodiment of the present invention. In this figure, the anode 4 is located at the bottom of a first cup 8 obtained through the stamping of a sheet of plastic material. Inside this cup 8 and above the anode 4 is fitted a second cup 9 produced in the same manner of similiar material as the cup 8 and the recess or chamber of which contains the electrolyte 3, the cathode 2, and the collector of positive charges 1. The open faces of both cups 8 and 9 are on the same upper side so that both cups face in the same direction.

These two cups 8 and 9 are apertured in their central section at 35 and 36 and are provided with outer peripheral flanges 19 and 20 bearing over each other, and over the flange of the upper cup 9 there is applied a sheet 10 of plastic material which is also apertured centrally at 34 and has an outer edge 18 overlapping flanges 19 and 20.

The flanges of the cups 8 and 9 and the outer edge of the sheet 10 are then welded together, whereby the imperviousness or desired hermetic seal required between the anode 4 and the cathode 2 is obtained.

Fig. 6 of the drawing illustrates a further modification of embodiment of the present invention. In this modification four sheets of plastic material 11, 12, 13, and 14, which are centrally apertured at 40, 39, 38, 37 are used. Between the sheets 11 and 12 which have been stamped to form cups are laid one or more components of the cell, such as for instance the collector 1 of positive charges, and in all cases the cathode 2 forms part of said components carried between the sheets 11 and 12.

Between the two other sheets 13 and 14 stamped to form cups are laid the remaining components of the electrochemical chain which have not been laid between the two first sheets 11 and 12 to wit, in the example illustrated the electrolyte carrier 3, and the anode 4. The cupped sheets 11 and 12 have overlapping flanged edges 21, 22, 23, 24, all of which flanged edges project outwardly from the cup.

The four sheets 11, 12 and 13, 14 of Fig. 6 are then welded pairwise through their outer edges so as to form thus two recesses or cups or chambers D and E which, when superposed, form the complete individual cell with its four components, and the anode and the cathode being always inserted in different recesses or chambers.

A heavy pressure exerted on the cups or chambers which have thus been superposed provides for ionic conduction between the cathode 2 and the electrolyte carrier 3, and through the superposition of several similar cells in a stack or pile, it is possible to provide for electrical connection between the successive cells, for instance between the anode 4 of one cell and the collector of positive charges in the cell lying immediately above the first mentioned cell, without particles of the depolarizer mass being at any moment capable of being passed from the cathode 2 towards the anode 4.

In any of the embodiments described, and more particularly in the embodiment illustrated in Fig. 5, it may be of advantage, from the standpoint of an easy manufacture, for the polyvinyl or the like sheets, which are to form the recesses and to house the different components of the cell, to be of a different grade or kind of plastic.

The outside sheets, for instance, the sheets 6 and 5 in Figs. 3 and 4, or the sheets 10 and 8 in Fig. 5, will then be made of a grade of plastic material such as for instance polyvinyl chloride which is plasticized, in a manner such that, when a number of superposed cells in a stack are submitted to pressure, the joint between them may be improved to become tighter, whereas for the intermediate sheet or sheets such as 7 or 9 in Figs. 4 and 5, it may be preferable to resort to another grade or kind of plastic material such as for instance a non-plasticized polyvinyl chloride so that it may consequently retain a greater rigidity.

The electrolyte carrier 3 can be arranged either above intermediate plastic sheet 9, or between the intermediate plastic sheet 9 and zinc anode 4. From the technical point of view the result is the same in either case, since lateral flow of depolarizing material toward anode 4 is prevented in either case. Figs. 7 and 8 show the first mentioned arrangement, Fig. 5 shows the second mentioned arrangement.

In Fig. 7 are shown separated and in juxtaposition the several parts of a cell of the type of Fig. 5. The outer plastic cup 8 has a flange 20, and the inner plastic cup 9 has a flange 19. The aperture in cover sheet 10 is shown at 15.

In Fig. 8, the several parts shown separated in Fig. 7 have been assembled together and the edges of the plastic elements have been welded together as by high frequency electric energy.

In Fig. 9, the two assembled cells F and F' of the type shown in Fig. 2, have respectively cathodes 42 and 42', paper electrolyte carriers 43 and 43', anodes (zinc) 44 and 44'. The collector of positive charges 41' of unit F belongs to the electrochemical chain with the elements 42', 43', 44', of upper cell F'. The collector of positive charges that belongs to the electrochemical chain with elements 42, 43, 44, of cell F is located in a cell below cell F, which is not illustrated.

The plastic casing of cell F has its bottom and top faces respectively centrally apertured at 51 and 52. The plastic casing of cell F' has its bottom and top faces respectively centrally apertured at 53 and 54.

For the intermediate plastic cup 9 of Fig. 5, the cut out or the hole should be such that the rim edges of the bottom of this intermediate cup should always have a minimum breadth of 1.8 millimeters whatever may be the surface of the constituent elements situated above and below.

This minimum breadth of 1.8 millimeters has been found to be sufficient to stop the flowing of the depolarizing mass toward the anode.

The tolerance, on the breadth of its edges of the intermediate plastic cup, can be only a few tenths of a millimeter.

Taking this into consideration, it can be said that the cut-out surface of the intermediate cup 9 should be greater than 78% of the surface of the base of this cup.

The desirable pressure for squeezing the superposed cells is 30 kilograms per square centimeter.

The quantity of the electrolyte solution contained in these elements is a function of the shape and size of the element. This electrolytic solution is distributed: one part in the electrolytic paper carried on the zinc anode, and one part in the depolarizing mass.

For the part of the solution distributed in the electrolyte paper, it is in the amount of 135 grams per square meter of dry paper whose weight is 96 grams per square meter.

For the part of the solution contained in the depolarizing mass, this is a function of the weight of this depolarizing mass and is about 0.3 cubic centimeter per gram of this dry mixture.

The material constituting the plastic sheets, for the sheets which are to constitute cups 8 and 9 (Fig. 5), is pure polyvinyl, such as the material sold on the market under the name of "Vynan," and for the cover 10 (Fig. 5) is of plastified polyvinyl such as that which is sold on the market under the name of "Klegetel."

The constituent elements which one would see through this central aperture of Fig. 3, are, first, the zinc anode 4 covered with the electrolyte paper 3, then the edges of the intermediate sheet 7 which has a central aperture, and, on the other side of this sheet, the depolarizing mass 2 and the flexible carbonaceous collector of charges 1, and finally the centrally apertured terminal sheet 5.

Preferably this electrolyte paper is positioned in the anode compartment, that is to say that in Fig. 5, the constituent element 3 is positioned on the entire anode surface of the zinc element 4, and the insulating intermediate cup 9 is superposed on its out-put edges.

It will be observed in Figs. 10–17 that the central apertures in the plastic members 8, 9, 10, are of the order of greater than one fourth of the diameter of the member, and in any case large enough to permit good electrical contact through the aperture between adjacent electrodes.

In Figs. 10–17, the depolarizer mass or cathode 2 has sides which for example may be 29 x 29 millimeters in a cell as actually constructed.

Through the aperture of the cover sheet 10 of Fig. 5, there can be seen the flexible carbonaceous collector of charges 1, which is itself superposed on the depolarizing mass 2, which in turn is superposed on the electrolyte carrying paper 3, the assembly of these three constituents being separated from the zinc anode 4 by the intermediate plastic cup 9.

The flexibility of the sheets of plastic material which are shown in Fig. 3, and of which plastic the large cup 8 and smaller cup 9 of Fig. 5 are made, should be such that after stamping, they will retain the cup form and the dimensions which it is desired to give them. The upper sheet 6 of Fig. 3, which corresponds to cover sheet 10 of Fig. 5, is preferably a simple cut-out sheet of plastified polyvinyl.

After the stack of elements of a pile or battery cell have been assembled, a heavy pressure is applied to squeeze these elements together, and this pressure is usually about 30 kilograms per square centimeter. Under the effect of this applied pressure, the carbonaceous collector of positive charges 1 of Fig. 5 is delivered or unloaded through the central aperture in plastic cover sheet 10, and is caused to make electrical contact with the anode of the adjacent cell through the central aperture of the large plastic cup which contains this collector 1.

The collector of positive charges designated 1' in Fig. 9 belongs to the electrolytic chain of the superposed element. This Fig. 9 shows again the electrochemical constituents of two superposed flat elements B according to Fig. 2.

The specific values of the properties of these materials used in the several parts of the present device are as follows:

(a) For the plastic "Vynan" constituting the large cup and small cup:

| | |
|---|---|
| Material | Pure polyvinyl chloride. |
| Specific weight | 1.38. |
| Softening range | Starting at 125° C. |
| Dielectric constant | 3.4. |
| Dielectric loss factor tang Q at 100 cycles | 0.02. |
| Sparking potential (kv./mm.) | 40. |
| Resistance to rupture (kg./cm.$^2$) | 500. |
| Resistance to folding | Above 10,000. |
| Resistance to mineral acids and to bases | No modification. |
| Resistance to fats and waxes | Total. |
| Welding | By high frequency. |

The thicknesses of the sheets before stamping into cup shape form are:
0.15 millimeter for the large cup 8
0.10 millimeter for the small cup 9

(b) For the cover 10:

| | |
|---|---|
| Material | Plastified polyvinyl. |
| Thickness of the sheet | 0.15 millimeter. |
| Degree of plastification | 40 parts of plastifier, 60 parts of pure polyvinyl. |
| Shore hardness (impact penetration) | Between 70 and 90. |

As is apparent in Figs. 10–17, the sides of the central apertures are respectively:

15 mm. for the large cup of terminal plastic cup 8 of Figs. 7 and 8.
27 mm. for the small cup 9 or intermediate plastic cup.
18 mm. for the cover or terminal plastic sheet 10.

The ratio of the cut-out surface to the surface of the base of the constituent elements which have been applied on to these cut-out faces are therefore:

20 to 25% for the large cup or terminal plastic cup.
30 to 35% for the cover or terminal plastic plate.

While polyvinyl has been mentioned as suitable for the plastic members described, there are other plastic materials known in the art which have similar physical and chemical properties and are suitable for this application.

In the present invention, (1) The inserted sheet separating the cathode from the anode is constituted of a chemically inert and mechanically resisting material, being a sheet of plastic material such as polyvinyl;

(2) The edges of this intermediate sheet of plastic material project outwardly and are sealed along the likewise projecting edges of the cups or chambers which respectively enclose the one the cathode and the other the anode.

By virtue of these particular arrangements, the tightness between the edges of the two cups or chambers and the edges of the intermediate separating sheet is assured; and this condition obtains at the time of the assembly of a pile by juxtaposition under pressure of a plurality of similar elementary cells.

At the time of this juxtaposition and assembly under pressure being applied on the bodies of the cups or chambers of the elementary cells, the projecting edges of the several sheets of plastic material (constituting the cups or chambers and the intermediate sheet) remain sealed together without risk of shearing off, since this pressure is applied on the broad surface of contact of the edges of these different sheets which are sealed together.

Hence there will always be perfect tightness on the inside of each elementary cell, along the length of the inside walls of these cups or chambers, and no flow can occur between the cathode and the anode of each cell, whatever may be the value of the applied mechanical pressure on the stack.

The present invention presents, the arrangement, between two plastic cups or chambers enclosing, the one at least the cathode and the other at least the anode, of at least one separating intermediate sheet, likewise of plastic material, centrally perforated like the bottoms of the said cups or chambers, and comprising laterally projecting edges, sealed along the laterally projecting edges of these cups or chambers, in such manner as to prevent, because of the lateral fluid tightness thus obtained, any flow of material from the cathode toward the anode, along the length of the internal walls of the cups or chambers, even when a pressure is applied to a stack of a plurality of superposed elementary cells.

The plastic sheet 9 which is highly resistant and electrically insulating, partitions to a certain extent along the inside periphery of the cell, the cathode compartment from the anode compartment, so that exchanges between the two compartments can take place only in the ionic state through the open part of this sheet 9. And the inner perforation of this sheet 9 in no way makes superfluous its role as a barrier as has been previously explained.

The external tight closing of this cell is provided by the sealing together of the edges of the two outer sheets 8 and 10 and intermediate sheet 9 all of which are of plastic material.

In the present invention there are provided:

(a) Two compartments containing the one the depolarizing mass (cathode) and the other the anode (zinc).

(b) A centrally perforated sheet of plastic material partially enveloping each of the two compartments.

(c) Outwardly projecting edges of these two sheets of plastic material.

(d) An intermediate sheet, likewise of plastic material, very resistant mechanically, with central perforation (to permit ionic exchanges), comprising a narrow internal edge to prevent the flow of depolarizing material toward the zinc electrode, and comprising outwardly projecting edges which are inserted between the outwardly projecting edges of the two first mentioned sheets of plastic material which partially envelope the two compartments.

The flat element thus constituted is then surrounded, on its four faces, with three outwardly projecting edges exactly superposed, which edges can be hot welded, as by high frequency current for example, in such manner as to give absolute tightness to the element so constituted.

As to the degree of applied compression of the pile of the battery, this pressure is required for several effects:

(1) To reduce the contact resistances from one cell to the next cell. In the present arrangement, the collector 1 of the positive charge of Fig. 5, for example, is a known flexible conducting carbonaceous material which under the effect of the assembling pressure, becomes compressed in the cut-out space of the outward insulating sheet 10 as well as in the spaces of the adjacent cell, where it assures effective electrical conducting contact with the zinc electrode of this latter cell while thus attaining the placing in series of the two adjacent cells.

(2) The paper 3 of the present invention, Fig. 5, serving as a carrier for the electroylte is any absorbing paper.

The agglomerated depolarizer 2 comprises, an electrolytic solution which confers on it a certain compactness. It is at the time of the assembly under pressure of several cells that the liquid of the depolarizing mass 2 is squeezed out and delivered toward the electrolytic paper 3 which, upon becoming moistened, forms a jell.

It will be realized that, in order to attain these two results, the pressure applied should be considerable and there is apparent the importance which is presented by the intermediate sheet 9 of plastic material of Fig. 5 (or 7 of Fig. 4), in order to avoid that, under this crushing action, the depolarizing mass should come into contact with the zinc electrode.

This so applied pressure is a function of the cross section of the cells and of the degree of humidification of the depolarizing mass.

For the smallest units of battery piles, such as for hearing aids, it can be of the order of 30 to 50 kilograms per square cm.

The embodiments of the present invention which have just been described, with reference to the accompanying drawings have been disclosed only by way of examples and by no means in a limiting sense, and many detail modifications and many arrangements of the recesses or chambers and of the partitioning of the cells different from described, may be resorted to without widening the scope of the invention as defined in the accompanying claims.

Polyethylene or polystyrol could be used instead of polyvinyl chloride.

What I claim is:

1. In a primary battery cell, a bottom terminal plastic member and a top terminal plastic member respectively provided with central apertures, intermediate plastic fluid impervious means separating said top and bottom members and being provided with a central aperture, said members and said intermediate means being so arranged as to form two chambers, said intermediate means having a transverse portion extending transversely of said chambers, the peripheral rim of said transverse portion of said intermediate means adjacent said aperture having a minimum transverse width of 1.8 millimeters and constituting an ionically impermeable barrier, battery components comprising a cathode and an anode contained in said chambers, one said chamber containing the cathode and the other said chamber containing the anode, said bottom and top terminal plastic members and said means having engaging overlapping projecting edges projecting outwardly therefrom all of which edges are hermetically sealed together, said central apertures being of such size as to permit good electrical contact therethrough between adjacent electrodes.

2. In a primary battery cell, a pair of plastic cup-shaped chamber elements having faces and containing battery components comprising a cathode and an anode and each said element being open on one face, one said chamber element containing the cathode and the other said chamber element containing the anode, said cup-shaped chamber elements being provided with a central aperture on the closed face thereof opposite said open face and having a peripheral rim portion on said closed face surrounding said aperture, said two cup-shaped chamber elements being faced with their open faces toward each other, and a single intermediate fluid-impervious plastic sheet having a transverse portion extending transversely of said chamber elements and being provided with a central aperture and separating said chamber elements and said cathode from said anode, the peripheral rim of said transverse portion of said plastic sheet adjacent said aperture having a minimum transverse width of 1.8 millimeters and constituting an ionically impermeable barrier, said chamber elements and said sheet having adjacent engaging overlapping projecting edges projecting outwardly therefrom, all of which edges are hermetically sealed together, said central apertures being of such size as to permit good electrical contact therethrough between adjacent electrodes.

3. In a primary battery cell, a pair of plastic fluid-impervious cup-shaped chamber elements having faces and containing battery components comprising a cathode and an anode and each said element being open on one face, one said chamber element containing the cathode and the other said chamber element containing the anode, said two cup-shaped chamber elements being nested and faced with their open faces opening in the same direction, a plastic cover sheet covering the open face of the said chamber element, which is nested inside the other chamber element, said cup-shaped chamber element adjacent said cover sheet having a closed face opposite its open face which has a transverse portion extending transversely of said chamber element and being provided with a central aperture in the transverse portion of its closed face opposite its open face and having a peripheral rim of said transverse portion surrounding said last named aperture which has a minimum transverse width of 1.8 millimeters and constitutes an ionically impermeable barrier, said other cup-shaped element and said cover sheet each being provided with a central aperture, and said chamber elements and said sheet having adjacent overlapping projecting edges projecting outwardly therefrom all of which edges are hermetically sealed together, said central apertures being of such size as to permit good electrical contact therethrough between adjacent electrodes.

4. In a primary battery cell, a bottom plastic terminal cup-shaped member having faces of which one face is open, and being faced with its open face upward, a top plastic terminal cup-shaped member having faces of which one face is open, and being faced with its open face faced downward, a pair of intermediate complementary cup-shaped members each having faces of which one face is open, and being arranged back to back and mounted between said terminal members with their open faces respectively opening into the open faces of said terminal members and forming therewith respectively two chambers, the closed faces of said bottom and top terminal cup-shaped members and intermediate cup-shaped members opposite their respective open faces respectively having transverse portions extending transversely of said cup-shaped members and each being provided with a central aperture, in the transverse portions of its closed face the peripheral rim of said transverse portion of the adjacent centrally apertured faces of said intermediate members adjacent said apertures having a minimum transverse width of 1.8 millimeters and constituting an ionically impermeable barrier, said bottom terminal member and its adjacent intermediate member having adjacent engaging projecting edges which are hermetically sealed together, said top terminal member and its adjacent intermediate member having adjacent engaging projecting edges which are hermetically sealed together, battery components comprising a cathode and an anode contained in said two chambers so formed, one said chamber containing the cathode and the other said chamber containing the anode, said central apertures being of such size as to permit good electrical contact therethrough between adjacent electrodes.

5. A cell according to claim 3, the one of said chamber elements which is nested inside the other chamber element and is adjacent said cover sheet being formed of a plastic material which is substantially more rigid than the plastic material of which said other chamber element and said cover sheet are formed.

6. A primary battery cell according to claim 1, said plastic members and said intermediate means being of polyvinyl chloride.

7. A primary battery cell according to claim 2, said plastic cup-shaped members and said plastic cover sheet being of polyvinyl chloride.

8. A primary battery cell according to claim 3, said cup-shaped elements and said plastic cover sheet being of poylvinyl chloride.

9. A primary battery cell according to claim 4, said cup-shaped members being of polyvinyl chloride.

10. A primary battery cell according to claim 3, said cup-shaped chamber elements being of polyvinyl chloride, and said cover sheet being of plastified polyviny chloride.

References Cited in the file of this patent

UNITED STATES PATENTS

| | | |
|---|---|---|
| 2,487,985 | Ruben | Nov. 15, 1949 |
| 2,580,415 | Ellis | Jan. 1, 1952 |
| 2,820,081 | Daley et al. | Jan. 14, 1958 |

FOREIGN PATENTS

| | | |
|---|---|---|
| 493,884 | Belgium | June 1, 1950 |
| 517,301 | Belgium | Feb. 14, 1953 |
| 519,323 | Belgium | May 15, 1953 |